United States Patent

Caldwell et al.

[11] 3,924,485
[45] Dec. 9, 1975

[54] FINAL DRIVES WITH LOAD SEPARATING MEANS

[75] Inventors: Samuel I. Caldwell, Aurora; Robert S. Orr, Pekin, both of Ill.; Duane D. White, Bloomington, Minn.

[73] Assignee: Caterpillar Tractor Co., Peoria, Ill.

[22] Filed: July 15, 1974

[21] Appl. No.: 488,573

[52] U.S. Cl. .................... 74/410; 74/391; 180/9.62
[51] Int. Cl.² ........................................ B26D 55/12
[58] Field of Search .............. 180/9.62, 6.7; 74/411, 74/410, 391

[56] References Cited
UNITED STATES PATENTS

| | | | |
|---|---|---|---|
| 1,665,470 | 4/1928 | Norelius | 180/9.62 |
| 2,119,770 | 6/1938 | Bechman | 180/9.62 |
| 2,453,360 | 11/1948 | Burks | 180/9.62 |
| 2,702,603 | 2/1955 | Risk et al. | 180/9.62 |
| 2,978,051 | 4/1961 | Risk et al. | 180/9.62 |
| 3,244,027 | 4/1966 | Layman | 74/411 X |

*Primary Examiner*—Philip Goodman
*Assistant Examiner*—John A. Pekar
*Attorney, Agent, or Firm*—Ralph E. Walters

[57] ABSTRACT

A drive structure having a cantilevered shaft carrying at its distal end a track roller frame. A final drive gear and sprocket are rotatably mounted about the shaft with the mounting structure arranged to isolate the driver gear from loads acting on the roller frame and distal shaft end thereby effectively extending the life of the drive structure. In one form, the driver gear and driven sprocket member are carried by a tubular hub which is rotatably mounted to an inner end of the shaft. In another form, the driver gear and driven sprocket member are rotatably mounted to the shaft and nonrotatively, axially movably interconnected.

8 Claims, 2 Drawing Figures

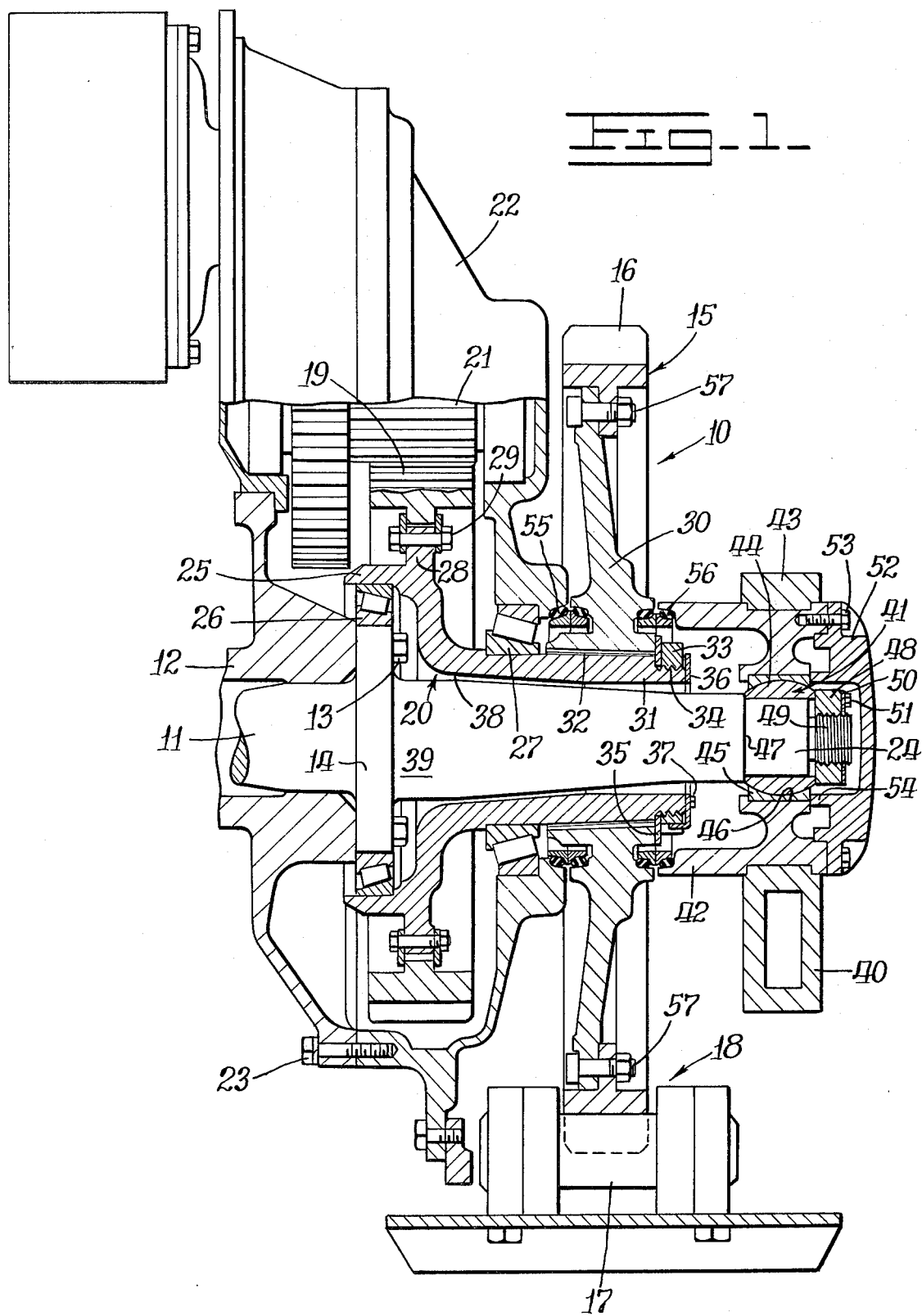

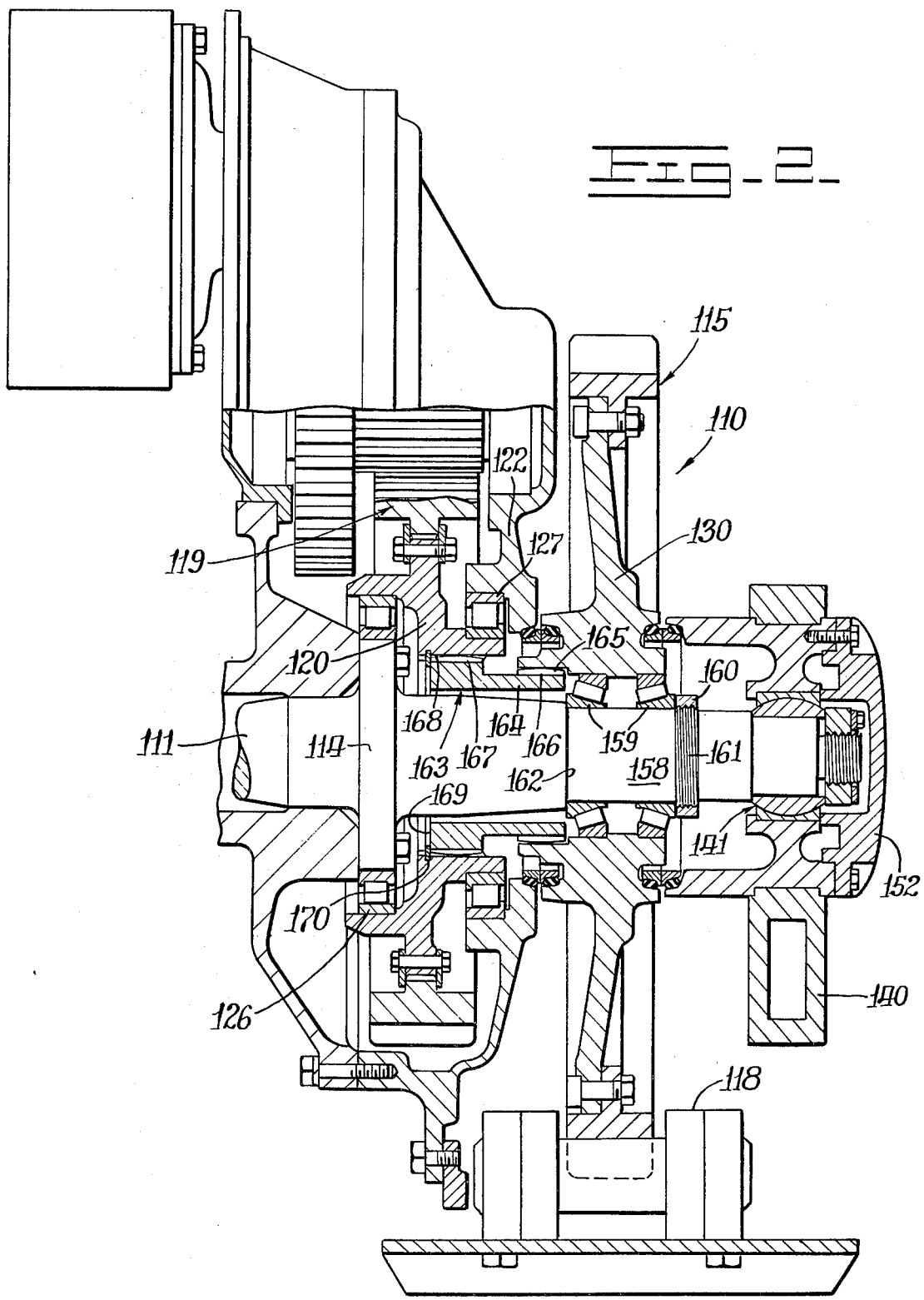
Fig_2

FINAL DRIVES WITH LOAD SEPARATING MEANS

BACKGROUND OF THE INVENTION

1. Field of the Invention

This invention relates to drive structures and in particular to final drive arrangements for track-type tractors and the like.

2. Description of the Prior Art

In copending United States letters Patent application Ser. No. 473,893, of Robert S. Orr, filed May 28, 1974, now U.S. Pat. No. 3,905,661 for a Spring Loaded Bearing Arrangement, and owned by the assignee hereof, an improved drive structure is disclosed wherein the final drive gear and driven sprocket member are carried on a tubular hub which is rotatably journalled at an inner end to a clutch case carrying the shaft, and at its opposite end, to adjacent the distal end of the shaft. The apparatus provides automatic maintained preloading of the bearings mounting the hub and also the bearings carrying a track frame at the distal end of the shaft.

Another example of a final drive arrangement is illustrated in United States letters Patent 2,397,910 of David B. Baker et al, wherein a tractor frame and drive track bearing structure is provided utilizing concentrically mounted tubular spaced members supporting the outer sprocket bearing for isolating the track roller frame mounting from the driver gear and driven sprocket member mounting. A problem arises in the Baker et al structure in that erratic loading may result from the sprocket attempting to follow the track in the normal use of the tractor.

In United States letters Patent 2,588,333, of William F. Wilson, a drive axle and track frame mounting for crawler tractors is disclosed wherein a bearing provided inboard of the sprocket is rigidly supported by a structural member. The shaft if rotatable and requires an outer antifriction bearing to support the shaft and sprocket thereby requiring alignment of three separate bearings in the manufacture of the apparatus.

SUMMARY OF THE INVENTION

The present invention comprehends an improved drive structure adapted to be used as the final drive arrangement in a track-type tractor which is extremely simple and economical of construction while yet providing improved long gear life and effectively minimum maintenance.

The drive structure includes a fixed shaft which carries at a distal end a load, such as a track roller frame. The final driver gear and driven sprocket member are rotatably associated with the fixed shaft so as to effectively isolate load forces acting on the distal end of the shaft from the driver gear.

Thus, the invention comprehends providing improved means for mounting the driver gear and driven member coaxially rotatably about the fixed shaft including means connecting the driver gear to the driven member for concurrent rotation. The mounting means further defines means for preventing transmission of forces acting on the shaft outer end from deflecting the drive gear.

In one illustrated embodiment, the means for mounting the drive gear and driven member to the shaft include a tubular hub having opposite ends, means for rotatably mounting one end of the hub coaxially to the shaft inner portion with the hub extending outwardly therefrom in spaced coaxial relationship to the shaft, means for mounting the driver gear to the hub one end, and means for mounting the driven member to the hub at a position spaced outwardly from the one end.

More specifically, the driven member may be mounted to the outer end of the hub.

In another illustrated embodiment, the means for mounting the driver gear and driven member on the shaft include means for rotatably mounting the driver gear to the inner portion of the shaft, means for rotatably mounting the driven member to a portion of the shaft outwardly of the driver gear, and means for non-rotatively, axially movably interconnecting the driver gear and driven member.

BRIEF DESCRIPTION OF THE DRAWING

Other features and advantages of the invention will be apparent from the following description taken in connection with the accompanying drawing wherein:

FIG. 1 is a fragmentary diametric section of a final drive structure of a track-type tractor, embodying the invention; and FIG. 2 is a fragmentary diametric section of a modified form of a final drive structure of a track-type tractor, embodying the invention.

DESCRIPTION OF THE PREFERRED EMBODIMENTS

In the exemplary embodiment of the invention as disclosed in FIG. 1 of the drawing, a final drive structure generally designated 10 is shown to comprise a shaft 11 fixedly secured to a bevel gear and steering clutch case 12 by suitable means, such as bolts 13, clamping a collar portion 14 of the shaft to case 12.

The final drive structure includes a driven sprocket member 15 which is provided with suitable teeth 16 engaging bushings 17 of a tractor chain generally designated 18 for driving the chain as in the operation of a track-type tractor or the like. Sprocket 15 is driven by a driver gear 19 by an interconnecting hub generally designated 20. Driver gear 19, in turn, is driven by a cluster gear 21, the gears being disposed within a housing 22 secured to the case 12 by suitable means, such as screws 23. Housing 22 effectively defines an oil-tight enclosure for the gears.

Collar 14 effectively defines an inner portion of the shaft spaced substantially inwardly from the distal end portion 24 thereof. Hub 20 includes an inner end portion 25 which is rotatably mounted to the inner collar portion 14 by suitable roller bearings 26. The hub is further rotatably journalled to the housing 22 by outer bearings 27. Driver gear 19 may be removably secured to a mounting portion 28 of the hub at inner end 25, by suitable means, such as bolts 29.

Sprocket 15 includes a hub portion 30 which is fixedly secured to the outer end 31 of hub 20 as by a spline coupling 32. A lock nut 33 is provided on a threaded portion 34 of hub end 31 for use with a suitable washer 35 in locking the splined connection of the sprocket hub portion 30 to the hub end 31. A suitable retainer 36 secured to the hub end 31 by a screw 37, or the like, may be provided for preventing loosening of the lock nut 33.

As shown, hub 20 is provided with a through bore 38 which is slightly larger than the portion 39 of shaft 11 therein to permit free movement of the hub coaxially about the shaft for rotation of sprocket 15 by the drive gearing.

As indicated above, in the illustrated embodiment, the drive structure is adapted for use in a track-type tractor. Thus, the track roller frame rail portion 40 is swingably, or pivotally, mounted to the distal end 24 of the shaft, and in the illustrated embodiment, is mounted thereto by a spherical bearing generally designated 41. Frame 40 is mounted to a bearing housing 42 by a suitable clamp 43.

Bearing 41 includes a segmentally spherical inner member 44 and a complementary outer member 45 received in a suitable bearing recess 46 of the housing 42. The bearing is retained against an outwardly facing shoulder 47 of the shaft by a nut 48 threaded to a threaded end portion 49 of the shaft. The nut may be retained positionally by a retainer 50 and retainer screw 51. An end cap 52 is secured to housing 42 by suitable means, such as screws 53, and includes a shoulder portion 54 retaining the bearing portion 45 within the bearing recess 46 of housing 42.

Sprocket hub portion 30 may be sealed to housing 22 by a suitable metal-to-metal floating seal 55, and to housing 42 by a similar metal-to-metal floating seal 56.

Preloading of the bearings 26 and 27 is effected by a suitable dimensioning of housing 22.

As further shown, tooth portion 16 of the sprocket gear may be secured to the hub portion 30 by suitable securing means such as nut and bolt means 57.

Thus, in the drive structure 10, the driver gear 19 and driven sprocket member 15 are coaxially rotatably mounted about fixed shaft 11 in an improved manner. The gear and sprocket are interconnected for concurrent rotation while yet the mounting means effectively prevents transmission of forces acting on the distal end 24 of the shaft from deflecting the driver gear thereby minimizing wear and providing long trouble-free life of the drive arrangement. More specifically, the provision of the tubular hub 20, which is rotatably journalled inboard of the sprocket 15, effectively eliminates transmission of any deflecting forces from the rail portion 40 through the sprocket to the drive gear. As the shaft portion 14 is positively fixedly supported, deflection of the shaft is effectively completely isolated from the bearings 26 and drive means, including gear 19 and sprocket 15. As bearing 27 is disposed inboard of sprocket 15, an improved support of the hub 20 is provided minimizing binding and wear in the operation of the drive.

Referring now to the modified embodiment of FIG. 2, a drive structure generally designated 110 is shown to comprise a drive structure generally similar to drive structure 10 but utilizing a modified form of means for interconnecting and rotatably mounting the driver gear 119 and driven sprocket member 115 in drive structure 110, the hub 120 is rotatably mounted to the collar portion 114 of the shaft 111 by bearings 126 at the inner end of the hub and is rotatably mounted to the housing 122 by bearings 127 at the outer end of the hub.

The hub portion 130 of driven sprocket member 115 is rotatably journalled on a cylindrical mid-portion 158 of shaft 111 by suitable bearings 159. Bearings 159 may be suitable preloaded by a collar 160 threaded to a threaded portion 161 of the shaft at the outer end of portion 158 urging the bearings inwardly against an annular radial shoulder 162 at the inner end of shaft portion 158.

Sprocket 115 is nonrotatively axially movably connected to driver gear 119 by means of a spline coupling 163 including a tubular member 164 having a crown spline 165 at its outer end mating with an internal spline 166 in hub portion 130. At its inner end, the member 164 is provided with a crown spline 167 mating with an internal spline 168 in the gear hub 120. A snap ring 169 is provided in a groove 170 in the hub 120 to lock the member 164 in connected association with the gear hub 120 and sprocket hub portion 130.

In all other respects, drive structure 110 is similar to drive structure 10. Elements of drive structure 110 which are similar to corresponding elements of drive structure 10 are identified by similar reference numerals but 100 higher.

Drive structure 110 functions similarly to drive structure 10 in preventing transmission of forces acting on the distal end of the fixed shaft 111 from deflecting the drive gear 119 and thereby provides long trouble-free life of the drive structure. More specifically, drive structure 110 precludes transmission of deflection forces from shaft portion 158 through the drive sprocket hub portion 130 to the driver gear by means of the improved interconnection afforded by spline coupling 163 which, while effecting rotation of sprocket 115 with gear 119, permits movement therebetween to be accommodated by the spline coupling thereby preventing transmission of deflecting forces to the gearing. The crown splines 165 and 167 effectively preclude transmission of deflection movement of the shaft to the drive gearing which, as discussed above relative to drive structure 10, is rotatably mounted in maintained accurate coaxial relationship to the fixed shaft portion 114.

The foregoing disclosure of specific embodiments is illustrative of the broad inventive concepts comprehended by the invention.

We claim:

1. In a drive structure having a driver gear, a driven member, a shaft having an inner portion and an outer load support portion, and shaft support means rigidly supporting said inner portion of the shaft, the improvement comprising: mounting means rotatably mounting said driver gear coaxially about said inner portion of the shaft and having a portion extending outwardly in spaced coaxial relationship with said shaft; and means mounting said driven member to said mounting means portion for rotation with said driver gear, said driven member being disposed coaxially outboard of said driver gear, whereby load forces acting on said outer portion of the shaft are effectively isolated from said driver gear.

2. The drive structure of claim 1 wherein said mounting means includes a bearing carried by said inner portion of the shaft.

3. The drive structure of claim 1 wherein said mounting means comprises a tubular hub rotatably supported by said bearing means to be coaxially spaced about said shaft, said driver gear being coaxially connected to said hub and said driven member being coaxially connected to said hub outboard of said driver gear.

4. The drive structure of claim 1 wherein said mounting means includes a bearing carried by said inner portion of the shaft inboard of said driver gear.

5. The drive structure of claim 1 wherein said mounting means includes a bearing rotatably supporting said mounting means outboard of said driver gear.

6. The drive structure of claim 1 wherein said mounting means includes a bearing rotatably supporting said mounting means outboard of said driver gear and inboard of said driven member.

7. In a drive structure having a driver gear, a driven member, a shaft having an inner portion and an outer load support portion, and shaft support means rigidly supporting said inner portion of the shaft, the improvement comprising: means for mounting said driver gear and driven member coaxially rotatably about said shaft including means connecting said driver gear to said driven member for concurrent rotation thereof and arranged to prevent transmission of forces acting on said shaft outer end from deflecting said driver gear, said mounting means comprising a tubular hub having opposite ends, means for rotatably mounting one end of the hub coaxially to said shaft inner portion with said hub extending outwardly therefrom in spaced coaxial relationship to said shaft, means for mounting said driver gear to said hub one end, and means for mounting said driven member to said hub at a position spaced outwardly from said one end.

8. The drive structure of claim 7 wherein said means for mounting said driven member to said hub comprise means for mounting said driven member to the opposite, outer end of said hub.

* * * * *